Dec. 15, 1936.   P. E. BONNEAU   2,064,145
POLYCHROMATIC PHOTOGRAPH AND CINEMATOGRAPH METHOD
Filed March 14, 1933    3 Sheets-Sheet 1
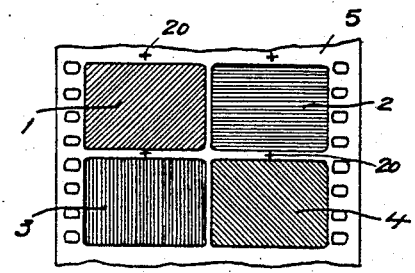
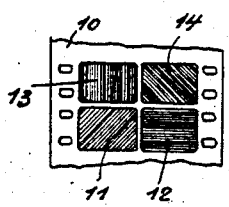
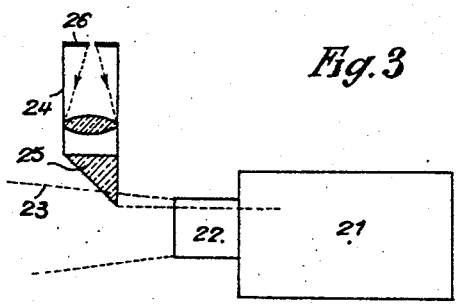
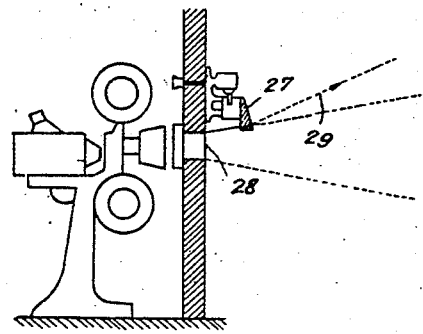
INVENTOR
PAUL EDMOND BONNEAU
BY
ATTORNEYS

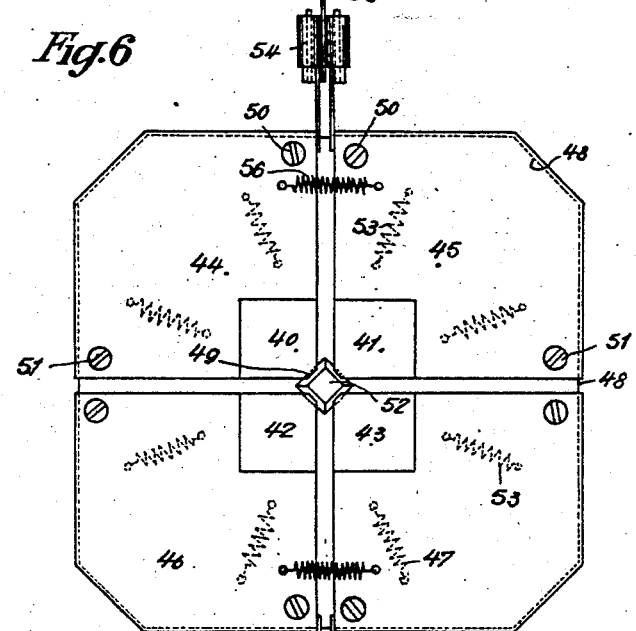
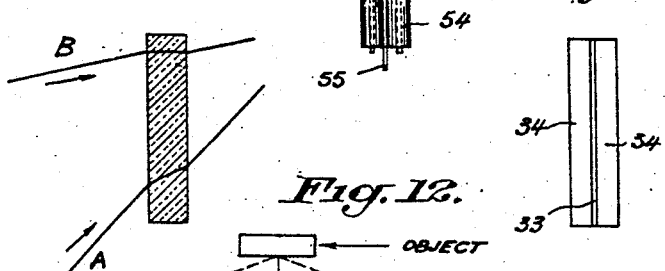
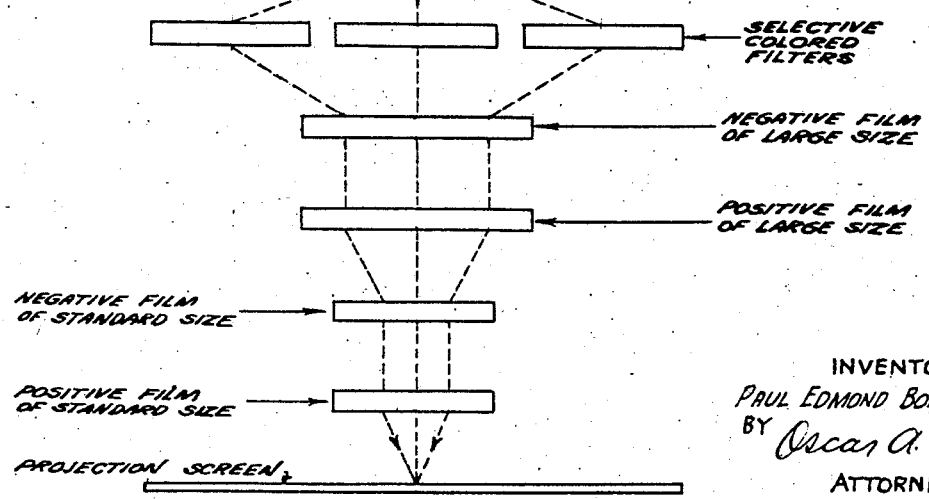

Dec. 15, 1936.  P. E. BONNEAU  2,064,145
POLYCHROMATIC PHOTOGRAPH AND CINEMATOGRAPH METHOD
Filed March 14, 1933   3 Sheets-Sheet 3

*Coloured parallel plate*

INVENTOR
PAUL EDMOND BONNEAU
BY Oscar A. Geier
ATTORNEYS

Patented Dec. 15, 1936

2,064,145

UNITED STATES PATENT OFFICE 2,064,145

POLYCHROMATIC PHOTOGRAPH AND CINEMATOGRAPH METHOD

Paul Edmond Bonneau, Paris, France, assignor to Gaston Chausson, Asnieres (Seine), France Application March 14, 1933, Serial No. 660,651
In France March 17, 1932

4 Claims. (Cl. 88—16.4)

This invention relates to colour photography and cinematography methods which consist in producing upon the same film, the same plate, or upon separate films, groups of negative pictures suitably juxtaposed and taken through selecting colored filters, from which positive pictures are produced these pictures being projected through suitable filters in order to re-constitute the natural colors by a suitable superposition upon a screen of selected views of distant shades.

In general the selected images are taken and projected simultaneously by means of separate lenses put in juxtaposition and equal in number to that of said selected images. In order that the method may be commercially worked to advantage, the separate positive images must be smaller than the standard size, but this results when they are projected in a lack of clearness and an exaggerated magnifying of the grain of the emulsion. The division of selected separate images of the same object used heretofore requires, unless certain complications are assented to, that the pictures should be taken at different points for every one of said selected pictures, this resulting in a parallactical defect. Lastly it produces an imperfect superposition of the various selected views upon the projecting screen when the film that carries the corresponding pictures happens to shrink thus bringing the homologous points of said pictures nearer together.

The present invention has for its object a combination of means which allow of obviating or at least of considerably reducing the aforesaid defects.

It is firstly characterized by the connection and co-operation of the three following means:

1st—A negative film, produced when taking the views and of a suitable size to allow of its carrying variously selected pictures of the same size printed simultaneously but having larger dimensions than those which may be produced for the corresponding positive pictures by grouping the latter in the dimensions of the positive picture which is of the standard dimension that corresponds to the projecting apparatus for which the film according to the present invention has been made.

2nd—A positive film printed from the above by optical reduction and showing groups of juxtaposed positive pictures of a smaller size than the negative pictures, each group occupying a place in the dimensions of the standard positive picture which corresponds to the considered projecting apparatus.

3rd—The simultaneous projection in superposition of the variously selected positive pictures in each group, by means of an ordinary projecting apparatus provided with an optical device which fulfills in particular the condition that the magnifying is greater than that used for projecting standard pictures with this same apparatus and is for example relatively to it in the same proportion than the size of the negative pictures specified at 1st, to the size of the positive pictures derived therefrom.

The use of these three combined means allows the production upon the screen of projected colored views which insure the same intrinsical clearness and fineness of grain as those which would be produced when projecting upon the same screen and at the same distance a positive picture of the same size as the negative standard picture from which is proceeds.

Considering that the method according to the present invention utilizes for the view taking process only, pictures having standard dimensions for instance, and for projecting only, pictures of a smaller size, it has the benefit of the advantages inherent to previous methods, without having their defects. If for instance the views are taken upon a 70 m/m wide negative film with the object of producing groups of four variously selected pictures each of standard dimensions that is 19 x 25 m/m, if by photographic reduction groups of images of a size twice smaller than that of the negative pictures are printed from said negative upon a 35 m/m positive film, and if lastly said positive is projected twice magnified, it will give the advantage of allowing the use of an ordinary projector for 35 m/m films, with the benefit of obtaining upon the screen a clearness as great as that resulting from the normal projection of a standard picture. In fact, the photographic reduction allows of producing by printing a positive which is twice as clear as the negative and this clearness becomes twice less in the projecting process owing to a magnifying which is twice stronger than usual.

The invention is also characterized by the use of means designed to facilitate during the projecting process, the rectification of the defects in superposition due to the shrinkage of the film.

These means consist essentially: 1st in cinematographing, during the taking process, a guiding mark placed so as to be printed outside the limits of the selected pictures, by means of an optical device formed integrally with the apparatus used for taking the views; 2nd, in projecting the superposition guiding mark outside the limits of the screen frame by means of an optical deflecting device at a point where its image may be observed by the operator directly or by means of a magnifying glass.

The appended drawings, show diagrammatically, by way of example, various modes of construction of the means used for the execution of the present invention.

Fig. 1 shows an example of the way in which the selected negative pictures may be grouped.

Fig. 2 illustrates on the same scale, the arrangement of the corresponding positive pictures upon the positive copy.

Fig. 3 is a diagram of the arrangement provided in the taking process to take a guiding mark with every negative picture.

Fig. 4 is a detail plan view of part 26 of Fig. 3.

Fig. 5 illustrates diagrammatically the arrangement provided in the projecting process for projecting the guiding marks upon the same point.

Fig. 6 is a diagrammatic front elevation of an adjusting device for the refracting plates used to correct the parallax.

Fig. 10 illustrates the absorption effect realized by a refracting plate constituting a colored filter for two light rays having different incidences.

Fig. 11 is a diagrammatic view showing a practical mode of execution of a colored filter.

Fig. 12 is a diagram representing the steps of the method.

Figure 7:
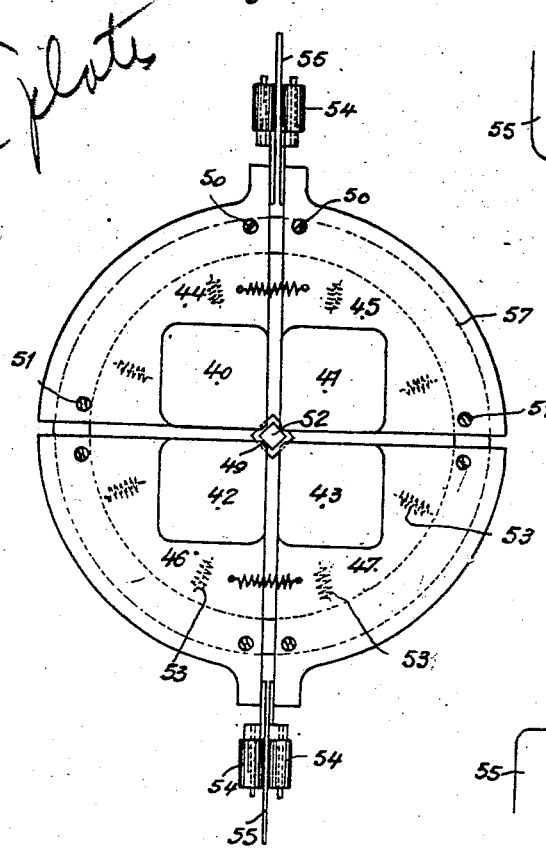
Fig. 7 is a front view showing a modification of said device.

Fig. 1 shows an arrangement of four selected standard negative pictures 1, 2, 3, 4, variously selected through filters having for example respectively the following colours: blue, green, red and yellow. In this example a very wide negative film 5 is used in the apparatus for taking the views and a length which is double the height of a standard picture is hidden away at every closing of the shutter.

Any other mode of producing and of grouping selected standard negative pictures may be used without departing from the principle of the invention. In fact, apparatus for taking views which allow of producing upon one and the same film standard negative pictures arranged in a complex manner are well known. Moreover every group may comprise any desired number of selected pictures provided that said number is higher than two.

The second element of the combination of means which allow the execution of the present invention requires the production of a positive film such that for example the group of selected positive pictures appears in the limits of a standard picture, each of these positive pictures appearing in a reduced size.

Fig. 2 illustrates, drawn at the same scale as Fig. 1, the arrangement upon a standard film 10 of positive pictures of reduced size 11, 12, 13, 14. It will be evident that there is no difficulty in producing the positive print 10 from the negative film 5. It will be sufficient that the printing process takes place in a cinematographic printing apparatus of the type commercially used for producing from a negative film a positive film of smaller size. In the present case it will be sufficient for the reduction ratio to be of the order of 2/1.

It will be understood that any desired arrangement for the 4 pictures 11, 12, 13, 14 may be adopted provided that they are inscribed in juxtaposition in the limits of a standard picture.

The third element in the chain of means combined for the execution of the principle of this invention consists in effecting the projection with an objective which presents an increased magnifying, such for example that the small size pictures 11, 12, 13, 14 give a view which covers over, at the same distance, substantially the same surface upon the screen as the views produced with standard pictures with the considered projecting apparatus.

Supposing for instance that the pictures 11, 12, 13, 14 have linear dimensions equal to half those of the pictures 1, 2, 3, 4 it will be sufficient to double the magnifying effect of the projecting optical device in order to produce the desired result.

Four separate lenses which respectively collect the light pencils issuing from the pictures 11, 12, 13, 14 and project each one of them with a magnifying effect which is double that of the one normally used for covering over the screen with views provided by standard pictures, may be used for example for the projection.

It is well known that films are liable to a shrinkage which may exceed one per cent and which consequently disturbs the relative positions of the pictures 11, 12, 13, 14.

It will therefore be necessary to give to the operator who effects the projection the facility of adjusting up in a very simple manner the regulating elements of the optical projecting devices so as to restore the superposition of the selected views upon the screen.

The hereinafter described device will greatly facilitate the superposition adjustment.

When taking views upon the film it is customary to provide a margin of about one millimeter between the standard negative pictures. In this margin the operator will take a small guiding mark constituted for example by a luminous cross upon a dark ground located at the extreme edge and slightly beyond the field of the photographed object. In order to allow this the frame which in the photographic apparatus will limit the outline of each picture is slightly notched at the desired place. In these conditions the image of the guiding mark will appear at 20 as shown for example in Fig. 1.

This guiding mark may be systematically located in the scene to be cinematographed but it will be preferable to make it integral with the apparatus used for taking the views as shown by way of example in Fig. 3. Suppose 21 is the apparatus used for taking the views and 22 the lens. I place at the extreme edge of the field 23 a collimator 24 rigidly connected with the setting of the apparatus which reflects in the lens, by means of a prism 25 the image strongly illuminated in white light of a diaphragm 26 carrying the guiding mark shown in Fig. 4.

When the projection takes place if the superposition of the selected views is correct, a white cross will appear in the margin of the projecting screen. If this white cross is reproduced in four places the operator will operate the proper regulating devices so as to restore the superposition.

In order to avoid that the attention of the spectators should be drawn to the guiding mark in the margin of the projecting screen, a prism 27 secured for instance upon the wall of the projector cabin, slightly above the opening 28 and whose position may be adjusted from the interior of the cabin, collects at the extreme edge of the field, the light pencil from the guiding cross and deflects it along 29, above or to the side of the screen towards a place upon the wall of the scene or any other predetermined place.

Figure 9:
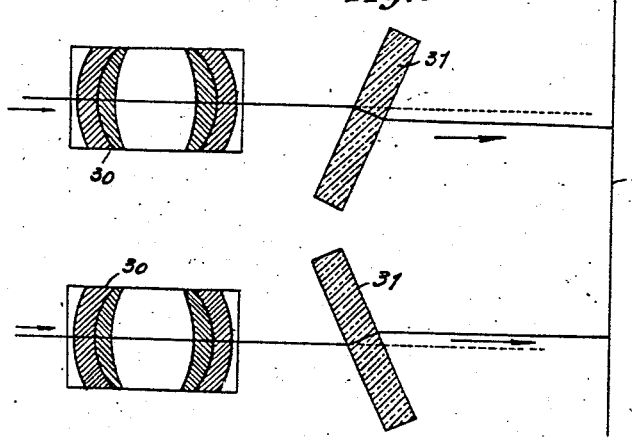
Fig. 9 is a diagram illustrating a combined lens and refracting plate with parallel faces.

It is well known that the effect of the parallax due to the distance between the axes of the lenses 30, Fig. 9, used for example for taking the views results in the fact that between any two homologous points of the picture upon the film 32, proceeding from the same point of the object which is not located in the infinite, there is a distance which is slightly larger than that existing between the lens axes. This difference is inversely proportional to the distance between the object and the apparatus used for taking the views. The pictures are therefore dissimilar when they represent objects located at different distances and their strict superposition is not possible. According to the invention I may utilize a device having for its object to bring slightly nearer together both images so as to annihilate the parallactical difference for the image of objects located at the same predetermined distance from the apparatus used for taking the views. The distance between the respective pictures of the nearest objects will be greater in that case than that between the axes of the lenses, and the distance between the pictures of the more remote objects will be smaller. It will thus be possible, according to the composition of the picture to rationally distribute the blemishes due to the parallax. A preferred disposition consists in annihilating them for the picture of objects located in the plane of the principal object.

To this end, the part pictures are slightly displaced relatively to each other by causing the light pencils which produce them to pass respectively through glass plates 31 having parallel surfaces, or whose surfaces form a very small angle with one another. These plates are suitably inclined with respect to the path of said light pencils so as to produce both horizontally and vertically the above mentioned rectification of the parallactical defect for a given plane of the photographed scene.

One of the part pictures may remain stationary and the others may be displaced relatively to it. In that case, the number of glass plates may be inferior by one to that of the part pictures. The required effect may be obtained by giving the plates different inclinations about a horizontal axis and about a vertical axis without these inclinations being the same for the other plates in the system. The plates may also be given symmetrical positions or positions depending from one another the adjustment of the inclination being produced by the intermediary of a common driving part which is actuated to open or close the pyramid whose lateral sides are formed by the glass plates.

Fig. 6 illustrates by way of example a device which allows of adjusting the inclination of four glass plates corresponding to four part images. These glass plates 40, 41, 42, 43 are secured upon settings 44, 45, 46, 47. Each unit constituted by the plate and its setting rests at three points upon a frame 48 by the edge 49 and two screw points 50, 51. The abutment of the edge 49 upon the middle projection 52 and the bearing of the screw points 50, 51 upon the frame 48 are insured by means of springs 53. The plate 40 may be caused to pivot about a substantially horizontal axle by screwing more or less the screw 50. It may be caused to pivot about a substantially vertical axle by an action upon the screw 51. The plate and its setting are guided in these various movements by a small bar or spur or a roller such as 54 bearing upon a wall 55 and maintained in this position by means of a spring 56.

Figure 8:
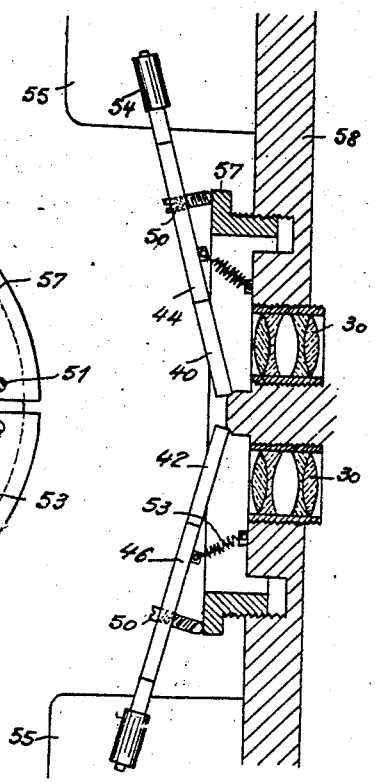
Fig. 8 is a sectional side elevation.

Figs. 7 and 8 show another mode of execution which allows simultaneous and symmetrical rotary movements of the four plates by causing the eight points of the screws 50, 51 to rest upon a ring 57 which may be moved more or less forward by screwing in a plate 58. The same characters of reference indicate the same parts as before.

Considering that the deflections of the pictures which it is desired to produce vertically and horizontally are not equal though substantially proportional, the respective distances between the points 50, 51 and the centre 52 will be unequal in a substantially inverted ratio. A greater accuracy may be obtained in this respect by giving to the edge of the ring 57 a concave or convex shape instead of a plane shape.

The arrangement shown diagrammatically in Fig. 9 may be used indifferently for taking the views, for projection and for printing.

The coloured filters to be used may be blended with the glass plates designed to serve for correcting the parallax.

If the plate is coloured in the mass to act as coloured filter, the quantity of light taken up by this filter will be in direct proportion with the path followed by the light ray in the thickness of the plate.

It will be seen in fact in Fig. 10 that the absorption is greater for the ray A than for the ray B. Consequently the selective action of a filter of that kind will vary with the inclination which it must receive to enable it to act as parallactical corrector. In order to guard against this the coloured mass will be very thin. In this manner I realize the classical constitution of a coloured filter made up of a coloured substance 33 (such as dyed gelatine) confined between two transparent plates 34—34 whose extreme faces are in parallel (Fig. 11).

In the case of a system of parallel refracting plates as above described being used for taking views, the mechanical part employed to move the ring 57 forwards or backwards may also control the whole optical system for focussing the pictures upon the emulsion (Fig. 12).

According to the nature of this invention, the above described devices allow the suppression of the parallactical defect not only for a certain plane of the scene but also, under certain conditions in a certain number of said planes as will be made clear by the following example.

Suppose that the apparatus used for taking the views allows of selecting four pictures through filters which are respectively indigo blue, green, yellow, red. Supposing now that it is desired to take a photograph of a scene showing in the foreground persons dressed in warm shades such as red and yellow, in front of a background of cold shades made up for instance of a green ground outlined upon a blue sky. The inclination of both plates of the yellow-red group will be adjusted so as to annihilate the parallactical effect at the distance of the foreground. That of the indigo blue-green will be adjusted for the distance of the background.

It has already been said in the preamble to this specification that the positive film of standard dimensions is printed by optical reduction from the negative film.

For manufacturing on a large scale, that is in order to produce a great number of positive copies it will be advantageous in order to avoid the use of special printing apparatus to make previously, by means of the wide negative, a standard negative, that is a negative having the "standard" width which corresponds to the considered projecting apparatus.

This standard negative may be produced in various manners, the following combinations being indicated by way of example only.

1st—A positive of the same size as the wide negative is printed, it is then used to give a standard negative by the optical reduction process.

2nd—A standard positive is printed by the optical reduction process from the wide negative and a standard negative is printed from said positive.

The diagram illustrated in Figure 12 represents the sequence of the steps of the applicant's method. The first step of this method is to take simultaneously groups of at least three negative images which are equal in size through selective colored filters. These images are taken on a negative film which is of a greater size than the standard positive film. Then these images are reproduced from the negative film on a positive film having the same dimensions as the negative film. Then by optical reduction a standard negative film is printed from the positive film of the larger size. Finally, a positive film of the standard size is printed from the standard negative film, the arrangement being such that the area of each group of positive images in the final positive film is substantially equal to that occupied by a positive standard image usually projected by the projecting apparatus for which the last-mentioned positive film is designed. When the positive images carried by the last-mentioned positive film are projected simultaneously and in superposition upon a projection screen with a magnification which bears the same ratio to the magnification ordinarily employed for a standard projection apparatus for the same screen dimensions as the ratio between the size of an original negative image and that of a reduced positive image, a picture is produced by said screen which has the same clearness as that which would be produced by the projection upon the same screen and at the same distance of a positive picture having the same size as that of its negative standard picture.

What I claim and desire to secure by Letters Patent of the United States is:

1. A polychromatic, cinematographic method, which comprises taking simultaneously groups of at least three negative images, which are equal in size, through selective coloured filters on a negative film of a size, which is greater than that of the ordinarily used standard positive film, printing an intermediary positive film with the same dimensions directly from the negative film, printing a standard negative film by optical reduction from said intermediary positive film, printing a positive film from said standard negative film, the area of each group of positive images in the last-mentioned positive film being substantially equal to that occupied by a positive standard image usually projected by the projecting apparatus for which the last-mentioned positive film is designed, and projecting simultaneously and in superposition the positive images of each group, said images being projected upon a projection screen with a magnification which ordinarily employed for a standard projection apparatus for the same screen dimensions, as the ratio between the size of an original negative image and that of a reduced positive image, whereby a picture is produced upon said screen, which has the same clearness as that which would be produced by the projection upon the same screen and at the same distance of a positive picture having the same size as that of its negative standard picture.

2. A polychromatic, cinematographic method, which comprises taking simultaneously groups of at least three negative images, which are equal in size, through selective coloured filters on a negative film of a size, which is greater than that of the ordinarily used standard positive film, chemically inverting said negative film, whereby a positive film is produced, printing a standard negative film by optical reduction from the first-mentioned film, printing positive working copies from the last-mentioned negative film, the area of each group of negative images in the last-mentioned negative film being substantially equal to that occupied by a positive standard image usually projected by the projecting apparatus for which the last-mentioned positive film is designed, and projecting simultaneously and in superposition the positive images of each group, said images being projected upon a projection screen with a magnification which bears the same ratio to the magnification ordinarily employed for a standard projection apparatus for the same screen dimensions, as the ratio between the size of an original negative image and that of a reduced image, whereby a picture is produced upon said screen, which has the same clearness as that which would be produced by the projection upon the same screen and at the same distance of a positive picture having the same size as that of its negative standard picture.

3. A polychromatic, cinematographic method, which comprises taking simultaneously groups of at least three negative images, which are equal in size, through selective coloured filters on a negative film of a size, which is greater than that of the ordinarily used standard positive film, reproducing said negative images with reduction without changing their relative arrangement on a positive film, in which each group of positive images occupies the space of a standard image, chemically inverting said positive film, whereby a negative film is produced, printing with the same dimensions working positive copies from the last-mentioned film, and projecting simultaneously and in superposition the positive images of each group, said images being projected upon a projection screen with a magnification which bears the same ratio to the magnification ordinarily employed for a standard projection apparatus for the same screen dimensions, as the ratio between the size of an original negative image and that of a reduced positive image, whereby a picture is produced upon said screen, which has the same clearness as that which would be produced by the projection upon the same screen and at the same distance of a positive picture having the same size as that of its negative standard picture.

4. A polychromatic, cinematographic method, which comprises taking simultaneously groups of at least three images having the same dimensions on a negative film, each group of images being taken simultaneously through coloured filters of different shades, placing upon said film a guiding mark for each image outside of the limits thereof, said guiding mark being obtained by a collimator connected with the photographic apparatus printing from said negative film a positive film comprising groups of positive images corresponding to the negative image, each positive image being of a smaller size than the negative image, projecting simultaneously and in superposition the positive images of each group through coloured filters upon a screen, the magnifying effect being greater than that which would be sufficient to cover the screen if the negative images were projected, and simultaneously projecting in superposition the guiding marks of the images of the same group, said guiding marks being visible to the operator.

PAUL EDMOND BONNEAU.